(12) United States Patent
Shitara et al.

(10) Patent No.: US 11,160,152 B2
(45) Date of Patent: Oct. 26, 2021

(54) VEHICLE LIGHTING SYSTEM

(71) Applicant: Toyota Jidosha Kabushiki Kaisha, Toyota (JP)

(72) Inventors: Masaki Shitara, Nagakute (JP); Yasukazu Honda, Miyoshi (JP); Ryo Hattori, Kariya (JP); Ken Iwasaki, Hino (JP); Yuma Hoshino, Hino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/931,783

(22) Filed: May 14, 2020

(65) Prior Publication Data

US 2020/0413519 A1 Dec. 31, 2020

(30) Foreign Application Priority Data

Jun. 28, 2019 (JP) .............................. JP2019-121345

(51) Int. Cl.
| | |
|---|---|
| *B60Q 1/00* | (2006.01) |
| *H05B 47/115* | (2020.01) |
| *B60Q 1/26* | (2006.01) |
| *B60Q 1/44* | (2006.01) |
| *B60Q 1/30* | (2006.01) |
| *B60Q 1/04* | (2006.01) |
| *B60Q 1/50* | (2006.01) |

(52) U.S. Cl.
CPC ......... *H05B 47/115* (2020.01); *B60Q 1/0023* (2013.01); *B60Q 1/04* (2013.01); *B60Q 1/2607* (2013.01); *B60Q 1/30* (2013.01); *B60Q 1/44* (2013.01); *B60Q 1/503* (2013.01)

(58) Field of Classification Search
CPC ... B60Q 1/0047; B60Q 1/2607; F21S 43/249; F21S 48/2281
See application file for complete search history.

(56) References Cited

U.S. PATENT DOCUMENTS

| | | | | |
|---|---|---|---|---|
| 2,914,701 A | * | 11/1959 | Bell ..................... | B60Q 11/005 315/82 |
| 2015/0219303 A1 | * | 8/2015 | Kai ....................... | F21S 43/243 362/551 |
| 2016/0369969 A1 | * | 12/2016 | Tokieda ................ | F21S 43/249 |
| 2017/0267163 A1 | * | 9/2017 | Watanabe ............. | F21S 43/241 |
| 2017/0336045 A1 | * | 11/2017 | Kobayashi ............ | F21S 43/249 |
| 2018/0026457 A1 | * | 1/2018 | Delevski .............. | H02J 7/0024 320/106 |
| 2020/0361375 A1 | * | 11/2020 | Mano ..................... | B60K 35/00 |
| 2020/0384814 A1 | * | 12/2020 | Chen ................... | B60C 23/0479 |

FOREIGN PATENT DOCUMENTS

| | | |
|---|---|---|
| JP | 2003-320896 A | 11/2003 |
| JP | 2007-099077 A | 4/2007 |

* cited by examiner

*Primary Examiner* — Tung X Le
(74) *Attorney, Agent, or Firm* — Dinsmore & Shohl LLP

(57) ABSTRACT

Upper lamps each having an upward-convex semicircular shape, and lower lamps each having a downward-convex semicircular shape are placed on left and right sides in a lower part of a front face of a vehicle. In conjunction, the upper lamps and respective lower lamps constitute annular lamps. The upper lamps and respective lower lamps can be illuminated independently of each other.

12 Claims, 6 Drawing Sheets

VEHICLE LIGHTING SYSTEM

CROSS REFERENCE TO RELATED APPLICATION

This application claims priority to Japanese Patent Application No. 2019-121345 filed on Jun. 28, 2019, which is incorporated herein by reference in its entirety including the specification, claims, drawings, and abstract.

TECHNICAL FIELD

The present disclosure relates to a vehicle lighting system including head lamps and rear combination lamps.

BACKGROUND

Vehicles are equipped with various lamps including head lamps, stop lamps, turn signal lamps, tail lamps, and position lamps (width indicators). The stop lamps indicate to the outside, especially to following vehicles, that brakes are operated and the vehicle is slowing down, and the turn signal lamps play the role of indicating a right/left turn, direction change, or the like of the vehicle to the outside.

JP 2007-99077 A discloses a lighting unit (1) modeled after an eye. The lighting unit (1) is modeled after an eye by putting a dark eye-shaped unit (6) in each milk-white lens unit (3) and adapted to change a line-of-sight direction by moving an eyeball with an actuator. Also, description is made of eyelid units (8) modeled after eyelids and eyebrow-shaped units (9) modeled after eyebrows and of how to change their shapes and postures by moving them. The condition of the driver's vehicle and intention of the driver are informed to other vehicles and pedestrians through the line-of-sight direction, eyelid posture, and eyebrow shape and posture. Note that the reference signs in parentheses above are those used in JP 2007-99077 A, and are irrelevant to the reference signs used in the description of the embodiment herein.

The lighting unit according to JP 2007-99077 A includes actuators to move the eyeballs, eyelids, and eyebrows. This complicates the structure, which may result in a cost increase.

SUMMARY

It is an object of the present disclosure to provide a lighting system capable of indicating a situation of the driver's vehicle using a simple configuration.

According to the present disclosure, there is provided a vehicle lighting system comprising: a pair of upper lamps placed on left and right sides on a front face or a rear face of a vehicle body, each of the upper lamps having an upward-convex semicircular shape; and a pair of lower lamps placed on the left and right sides on the front face or the rear face of the vehicle body, each of the lower lamps having a downward-convex semicircular shape, wherein the lower lamps constitute annular lamps in conjunction with the respective upper lamps. The upper lamps and lower lamps are allowed to illuminate independently of each other.

Since the two semicircular lamps are allowed to illuminate independently of each other, conditions of the vehicle can be indicated to people nearby using a simple configuration.

The lighting system may further comprise a controller adapted to control illumination of the upper lamps and the lower lamps; and a monitoring device adapted to detect any obstacle or person in a traveling direction of the vehicle, wherein when the monitoring device detects any obstacle or person, the controller may cause only the upper lamps to illuminate.

By causing only the upper lamps to illuminate, it is possible to indicate to the people nearby that the vehicle is stopping.

Also, the vehicle lighting system may comprise a controller adapted to control illumination of the upper lamps and the lower lamps; and a charging status detection device adapted to detect charging status of a battery carried by the vehicle, the battery being able to be charged with external electric power, wherein when the charging status detection device detects that the battery is being charged, the controller may cause only the lower lamps to illuminate.

By causing only the lower lamps to illuminate, it is possible to indicate to the people nearby that the vehicle is being charged.

Furthermore, at least either of the upper lamps and the lower lamps may include a peripheral light emission unit placed on a periphery and an inside light emission unit placed on an inner side of the peripheral light emission unit; and the peripheral light emission unit and inside light emission unit may be allowed to illuminate independently of each other. By causing the peripheral light emission unit and the inside light emission unit serve different functions, it is possible to concentrate functions of various lamps. Furthermore, the lighting system may comprise center lamps located in a region surrounded by the upper lamps and the lower lamps. Even if the upper lamps and lower lamps are deficient in illuminance, the center lamp can solve the illuminance deficiency.

The lighting system may further comprise a character display device located between the annular lamps placed on the left and right sides. Space between the left and right annular lamps can be used effectively.

BRIEF DESCRIPTION OF DRAWINGS

An embodiment of the present disclosure will be described based on the following figures, wherein.

DESCRIPTION OF EMBODIMENT

Figure 1:
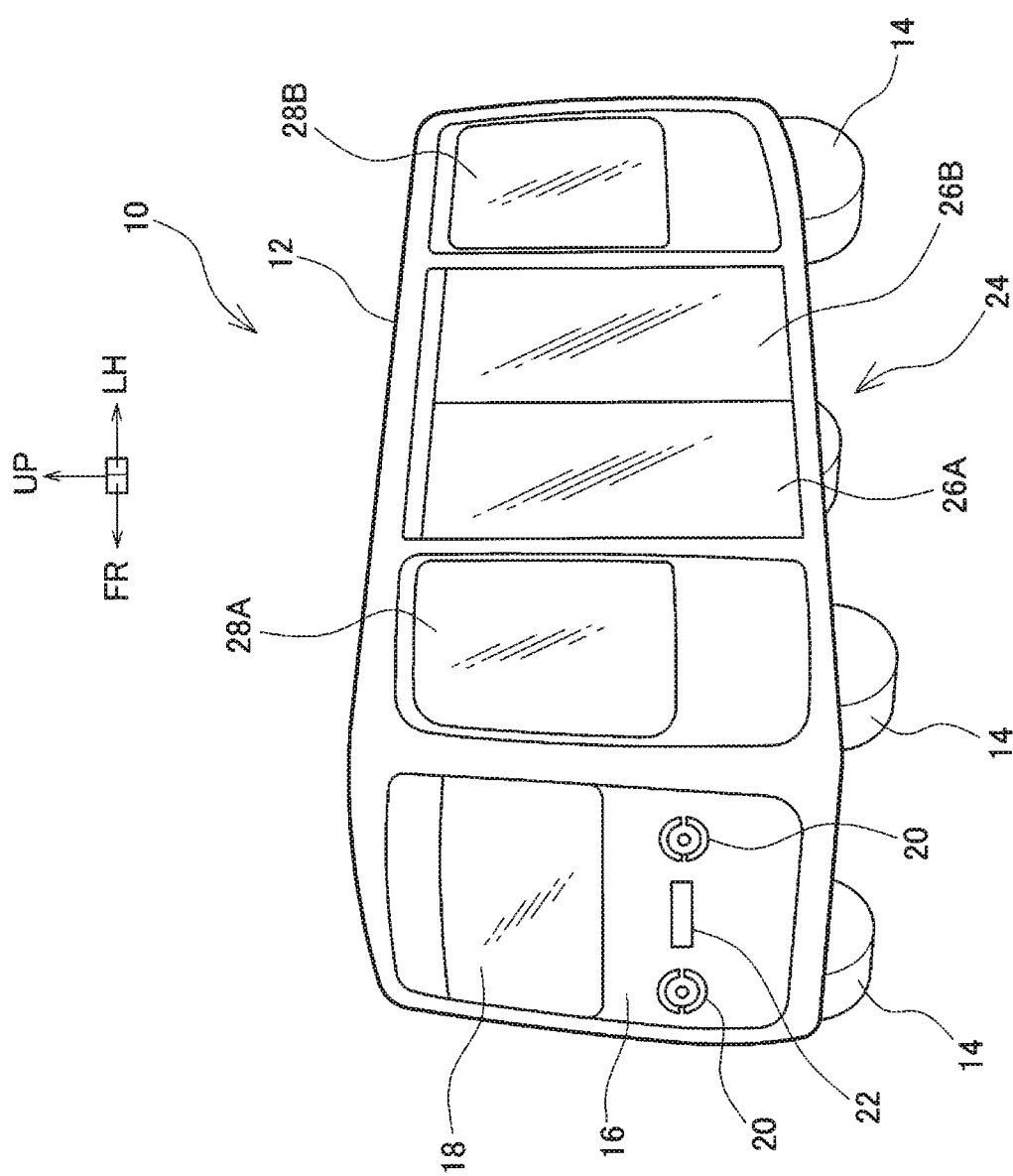
FIG. 1 is a diagram showing appearance of a vehicle according to an embodiment of the present disclosure.

An embodiment of the present disclosure will be described below with reference to the drawings. In the following description, unless specifically noted, the terms "front," "forward," "rear," "rearward," "left," "leftward," "right," "rightward," "above," "upward," "below," "downward," and the like indicating relative positions and orientations mean relative positions and orientations with respect to a vehicle. In the drawings, the FR, UP, and LH arrows indicate forward, upward, and leftward directions, respectively.

FIG. 1 is a perspective view schematically showing appearance of a vehicle 10. The vehicle 10 has a body 12 shaped as an approximately rectangular parallelepiped. The body 12 has the longest dimension in a front-rear direction, and the next longest dimension in an up-down direction. Wheels 14 are placed in four corners of the body 12. Windshield glass 18 is placed in an upper region of a front face 16 of the body 12, and combination lamps 20 are placed on left and right sides in a lower region. A character display device 22 is placed between the combination lamps 20. Back window glass (not shown) identical in shape with the windshield glass 18 on the front face 16 is placed on a rear face (not shown) of the body 12. Also, combination lamps (not shown) are placed on the rear face at locations corresponding to those of the combination lamps 20 on the front face 16.

An entrance door 24 is placed in a side face of the body 12. The door 24 is placed in one side face of the body 12: in a left side face in a region of left-side driving, and in a right side face in a region of right-side driving. Also, the doors 24 may be placed in both side faces. The door 24 is made up of two door panels 26A and 26B, which slide along the front-rear direction of the vehicle to open and close the door 24. Each of the door panels 26A and 26B is fitted with door glass, forming a door window. The door 24 is placed in an approximate center of the side face of the body 12 in the front-rear direction of the vehicle, and pieces of side window glass 28A and 28B are placed in front of and behind the door 24, forming side windows. In that side face in which the door 24 is not placed, a side window (not shown) is formed, extending in the front-rear direction along almost the entire body 12.

Figure 2:
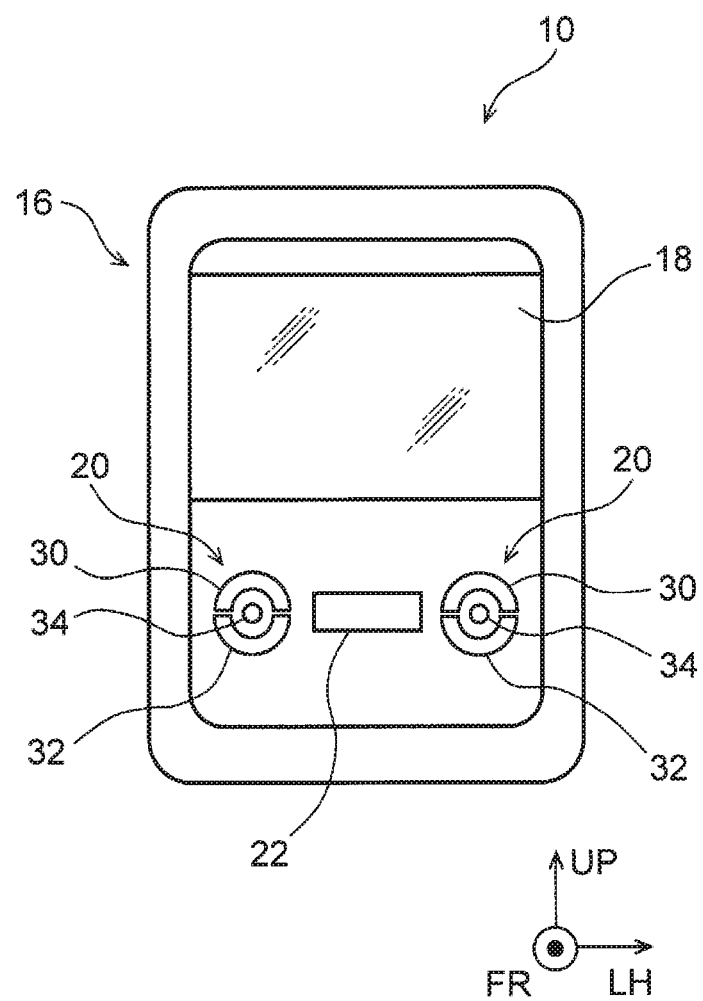
FIG. 2 is a diagram showing a front face of the vehicle.

FIG. 2 shows the front face 16 of the vehicle 10. Each of the combination lamps 20 includes an upper lamp 30 having an upward-convex semicircular shape and a lower lamp 32 having a downward-convex semicircular shape. The upper lamp 30 and lower lamp 32 are placed such that open sides of the semicircles face each other, constituting an annular lamp in conjunction with each other. A center lamp 34 is placed between the upper lamp 30 and lower lamp 32, and in particular, in a center of an annular ring formed by the upper lamp 30 and lower lamp 32. The upper lamp 30, the lower lamp 32, and the center lamp 34 can be illuminated independently of one another. Also, the upper lamp 30, the lower lamp 32, and the center lamp 34 are configured to be inconspicuous when turned off, and are designed such that the front face 16 will give a neat impression. To make the lamps inconspicuous when turned off, colors of the lamps when turned off may be made similar to those of panels around the respective lamps.

Figure 3:
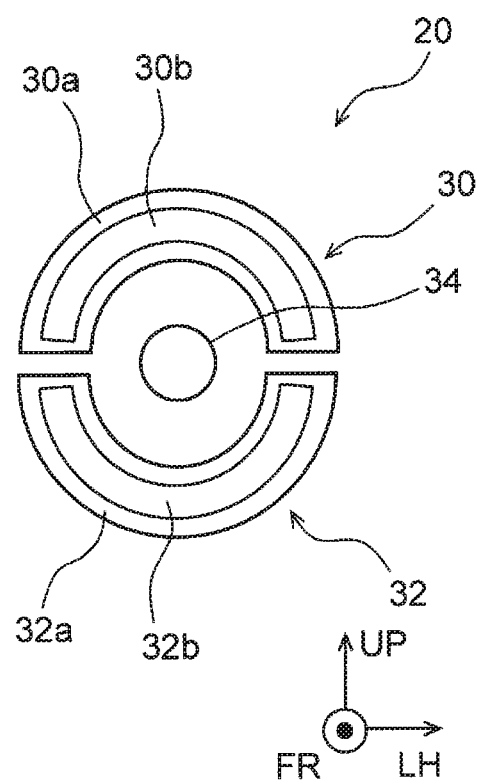
FIG. 3 is an enlarged view of a combination lamp.

FIG. 3 is a detail view of the combination lamp 20. Of the upper lamp 30, a peripheral portion and a portion on the inner side of a periphery can be illuminated independently of each other. The peripheral portion will be referred to as a peripheral light emission unit 30a and the portion on the inner side will be referred to as an inside light emission unit 30b. Of the lower lamp 32, a peripheral portion and a portion on the inner side of a periphery can also be illuminated independently of each other. The peripheral portion will be referred to as a peripheral light emission unit 32a and the portion on the inner side will be referred to as an inside light emission unit 32b. The center lamp 34 may be made up of either a single lamp or a combination of a plurality of lamps.

Of the combination lamps 20 on the front face 16, the center lamps 34 can be used as head lamps and the peripheral light emission units 30a and 32a of the upper lamps and lower lamps can be used as position lamps. The inside light emission unit 32b of each lower lamp can be used as a turn signal lamp. The inside light emission unit 30b of each upper lamp 30 may be used as a head light in addition to the center lamp 34. So long as sufficient illuminance can be obtained, by providing only the inside light emission units 30b of the upper lamps 30 as head lamps, the center lamps 34 may be omitted. Alternatively, one of the inside light emission unit 30b of the upper lamp and the center lamp 34 may be used as a high-beam lamp which emits long-reaching light, and the other of the inside light emission unit 30b of the upper lamp and the center lamp 34 may be used as a low-beam lamp which emits limited-distance-reaching light to reduce glare for oncoming vehicles.

The combination lamps 20 on the rear face may have the same configuration as the combination lamps 20 on the front face 16. Of the combination lamps 20 on the rear face, the center lamps 34 may be used as stop lamps, and the peripheral light emission units 30a and 32a of the upper lamps and lower lamps may be used as tail lamps. The inside light emission units 32b of the lower lamps can be used as turn signal lamps. The inside light emission units 30b of the upper lamps 30 may be used as back-up lamps, which illuminate when the vehicle 10 backs up. Functions of the lamps making up each combination lamp 20 may be combined in a manner different from that described above.

Figure 4:
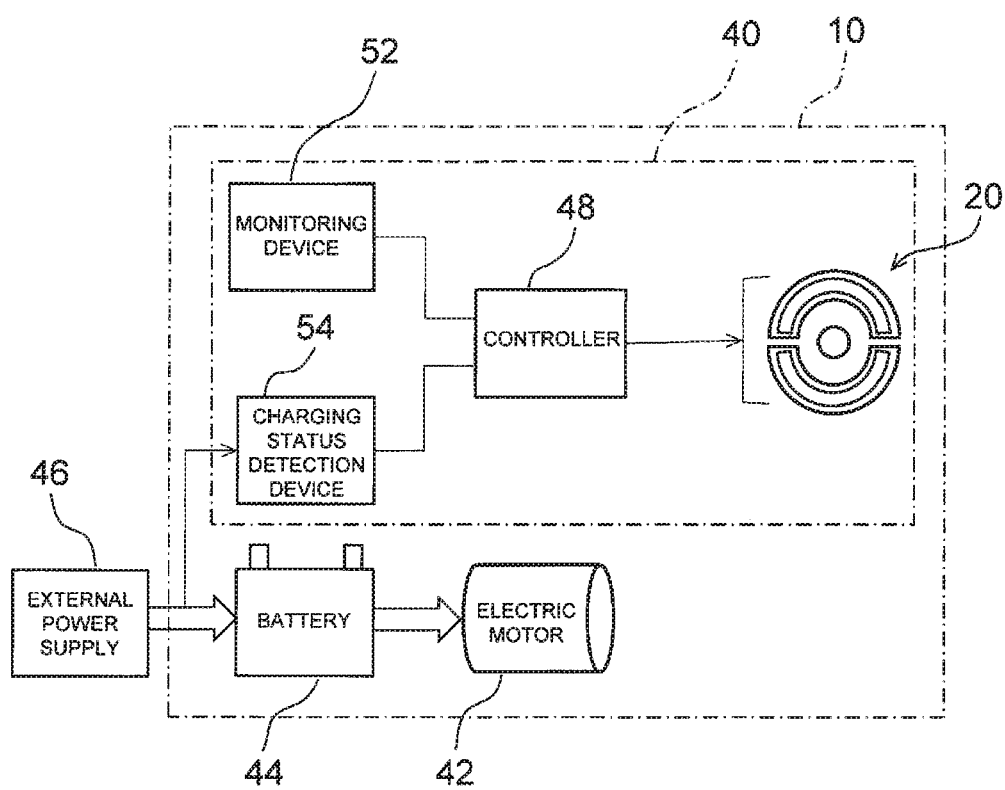
FIG. 4 is a block diagram showing a configuration of a lighting system according to the embodiment of the present disclosure.

FIG. 4 is a block diagram showing a configuration of a lighting system 40 of the vehicle 10 as well as a power supply configuration of the vehicle 10 in relation to the lighting system 40. The vehicle 10 is a so-called electric vehicle equipped with an electric motor 42 adapted to drive the vehicle. The vehicle 10 carries a battery 44 to supply electric power to the electric motor 42. The battery 44 can be charged by an external power supply 46.

The lighting system 40 includes a controller 48 adapted to control illumination of the lamps belonging to the combination lamps 20 as well as to control the character display devices 22. The controller 48 controls illumination of the combination lamps 20 and display on the character display devices 22 according to driving condition and surrounding circumstances of the vehicle. For example, when it is dark around the vehicle, the center lamps 34 (head lamps) of the combination lamps 20 on the front face 16 are caused to illuminate. Furthermore, the peripheral light emission units 30a and 32a (position lamps) of the upper lamps and lower lamps in the combination lamps 20 on the front face 16 are caused to illuminate, and the peripheral light emission units 30a and 32a (tail lamps) of the upper lamps and lower lamps in the combination lamps 20 on the rear face are caused to illuminate. At the time of a right turn or left turn, the inside light emission units 32b (turn signal lamps) of the lower lamps in appropriate combination lamps 20 on the front and rear faces are flashed. When brakes are operated, the center lamps 34 (stop lamps) of the combination lamps 20 on the rear face are caused to illuminate.

The lighting system 40 further includes a monitoring device 52 adapted to monitor surroundings of the vehicle 10, and in particular, circumstances ahead of the vehicle 10; and a charging status detection device 54 adapted to detect charging status of the battery 44 charged by the external power supply 46. A monitoring range of the monitoring device 52 includes a conceivable travel path of the vehicle as well as sidewalks, road shoulders, and side strips around the travel path. Thus, persons on the sidewalks are also subject to monitoring. The monitoring device 52 may further include a camera used to photograph the view in front of the vehicle, a LIDAR or radar whose coverage includes an area ahead of the vehicle, and a processing device adapted to detect any obstacle and person based on information obtained by the camera and the like described above. Also, in addition to, or instead of, the monitoring by the camera and the like, the monitoring device 52 may be configured to communicate with information terminals such as smartphones carried by pedestrians and monitor the presence or absence of pedestrians, particularly, pedestrians who are about to cross a road, based on information from sensors installed on streets.

Figure 5:
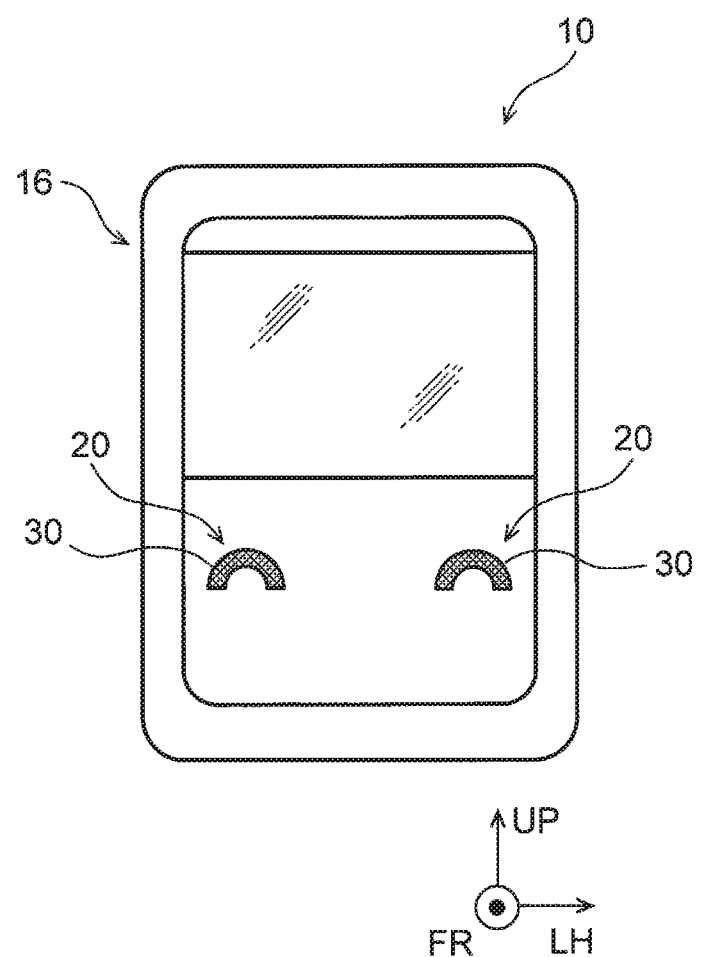
FIG. 5 is a diagram showing the front face of the vehicle with upper lamps illuminated.

When any obstacle or person is detected in a predetermined area ahead, if the vehicle 10 is a self-driving vehicle or is equipped with a collision-avoidance system, the monitoring device 52 stops the vehicle by operating brakes, and at the same time, transmits a signal to the controller 48, indicating the detection of the obstacle, person, or the like. Also, if there is any person standing still on a sidewalk at an entrance to a pedestrian crossing, the monitoring device 52 may detect the person as a person who is about to cross the road. Upon receiving the obstacle/person detection signal, the controller 48 causes only the upper lamps 30 of the combination lamps 20 on the front face 16 to illuminate. More specifically, the controller 48 causes the peripheral light emission units 30a and/or inside light emission units 30b of the upper lamps to illuminate. As shown in FIG. 5, when illuminated, the upper lamps 30 may look smiley, indicating that the vehicle 10 is giving way to the pedestrians who are going to cross or are crossing the road. If the vehicle 10 is not a self-driving vehicle or is not equipped with a collision-avoidance system, after any obstacle or person is detected ahead, the controller 48 waits until the vehicle 10 stops or the driver decelerates the vehicle by operating the brake to reach a predetermined speed, and then causes only the upper lamps 30 to illuminate. More specifically, the controller 48 causes the peripheral light emission units 30a and/or inside light emission units 30b of the upper lamps to illuminate. This also can indicate that the vehicle 10 is giving way to the pedestrians. Information on stoppage or speed of the vehicle 10 can be acquired based on a detection signal from a velocity sensor provided on the vehicle. Also, information on the driver's braking operation can be acquired based on a detection signal from a sensor provided on the vehicle and adapted to detect an amount of brake pedal operation.

As with the combination lamps 20 on the front face, of the combination lamps 20 on the rear face, only the upper lamps 30 may be illuminated when any obstacle or person is detected ahead. By causing the upper lamps 30 on the rear face to illuminate, it is possible to inform following vehicles that there are pedestrians who are about to cross the road. Furthermore, in addition to causing the upper lamps 30 to illuminate, the controller 48 may cause the character display device 22 on the front face 16 to display predetermined wording such as "Please go ahead" in letters. The character display device 22 on the rear face may be caused to display "There are traversers," "There are obstacles," or the like. The character display makes it possible to provide more detailed information to the people nearby. When it is detected that the pedestrians have finished crossing the road or that the obstacles have been removed, the previous illumination state may be restored by finishing the state of illumination of only the upper lamps 30. If the vehicle is driven by a driver, the illumination state of the combination lamps 20 may be returned to the original state when braking operation is finished or when accelerator operation is performed after the braking operation is finished.

Figure 6:
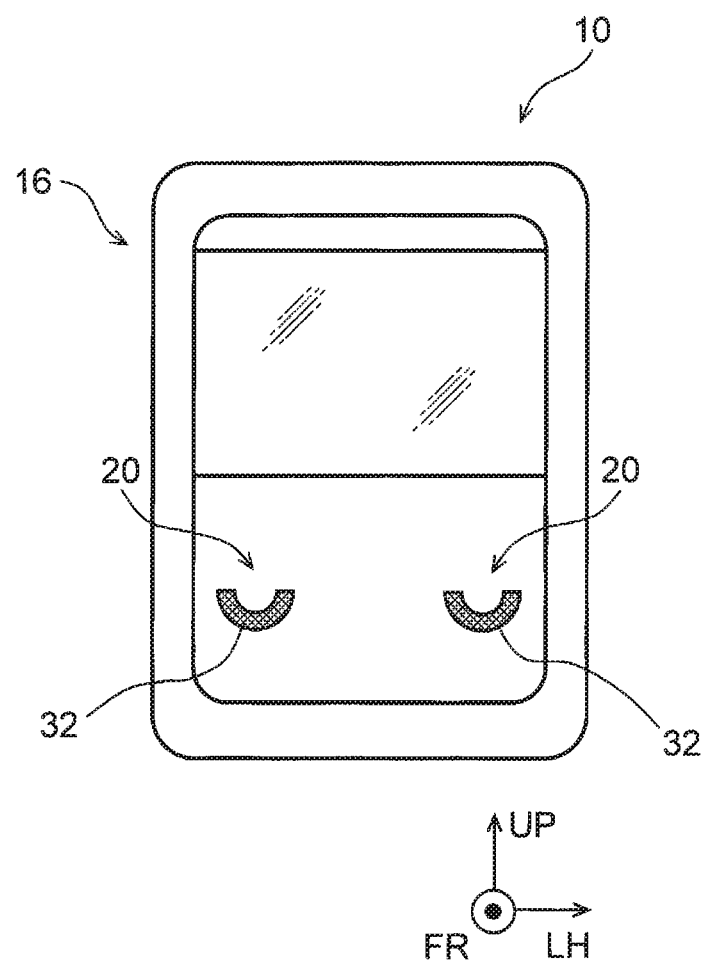
FIG. 6 is a diagram showing the front face of the vehicle with lower lamps illuminated.

While the battery 44 is being charged by the external power supply 46, the charging status detection device 54 transmits a signal to the controller 48, informing the controller 48 to that effect. The controller 48 causes the lower lamps 32 of the combination lamps 20 on the front face 16 to illuminate. The lower lamps 32, when illuminated, assume an expression looking like a sleeping face with the eyelids closed as shown in FIG. 6, indicating to the people nearby that the vehicle is being charged (resting). Furthermore, in addition to causing the lower lamps 32 to illuminate, the controller 48 may cause the character display device 22 to display predetermined wording such as "Charging" in letters. The character display makes it possible to provide more detailed information to the people nearby. As with the combination lamps 20 on the front face, of the combination lamps 20 on the rear face, the lower lamps 32 may be caused to illuminate, and the character display device 22 on the rear face may be caused to display "Charging." When the charging is completed, the lower lamps 32 may be turned off, indicating the completion of charging. In so doing, the character display device 22 may be caused to display, for example, "Charging complete." Also, if the charger plug is not pulled out even when charging is completed, the lower lamps 32 may be kept illuminated. This may indicate that the charger plug has not yet been pulled out. The controller 48 and charging status detection device 54 may be processing devices adapted to perform the above operations according to a predetermined program. Also, processing devices of the monitoring device 52 perform the above operations according to a predetermined program. The processing devices may be provided independently, or a single processing device may perform different operations.

The vehicle 10 may be any of a driverless self-driving vehicle, a vehicle switchable between human driving and self-driving, and a conventional vehicle driven by a driver. In the case of a vehicle switchable between human driving and self-driving, the illumination of the upper lamps 30 alone such as described above may be done only during self-driving. Even when eye contact between the driver and pedestrian is not possible, in place of the driver, the vehicle can inform the pedestrian that the vehicle is giving way to the pedestrian.

The vehicle 10 may be not only an electric vehicle, but also a hybrid vehicle equipped with an engine as well as with an electric motor for use to drive the vehicle, a so-called plug-in hybrid vehicle capable of being charged by an external power supply, or a conventional vehicle equipped only with an engine.

REFERENCE SIGNS LIST 10 vehicle, 12 body, 16 front face, 20 combination lamp, 22 character display device, 30 upper lamp, 30a peripheral light emission unit of the upper lamp, 30b inside light emission unit of the upper lamp, 32 lower lamp, 32a peripheral light emission unit of the lower lamp, 32b inside light emission unit of the lower lamp, 34 center lamp, 40 lighting system, 44 battery, 46 external power supply, 48 controller, 52 monitoring device, 54 charging status detection device

The invention claimed is:

1. A vehicle lighting system comprising:
a pair of upper lamps placed on left and right sides on a front face or a rear face of a vehicle body, each of the upper lamps having an upward-convex semicircular shape; and
a pair of lower lamps placed on the left and right sides on the front face or the rear face of the vehicle body, each of the lower lamps having a downward-convex semicircular shape, wherein:

the lower lamps constitute annular lamps in conjunction with the respective upper lamps;

the upper lamps and lower lamps are allowed to illuminate independently of each other; and an arc length of the pair of upper lamps is substantially identical to an arc length of the pair of lower lamps.

2. The vehicle lighting system according to claim 1, further comprising:

a controller adapted to control illumination of the upper lamps and the lower lamps; and a monitoring device adapted to detect any obstacle or person in a traveling direction of the vehicle, wherein when the monitoring device detects any obstacle or person, the controller causes only the upper lamps to illuminate.

3. The vehicle lighting system according to claim 1, further comprising:

a controller adapted to control illumination of the upper lamps and the lower lamps; and a charging status detection device adapted to detect charging status of a battery carried by the vehicle, the battery being able to be charged with external electric power, wherein when the charging status detection device detects that the battery is being charged, the controller causes only the lower lamps to illuminate.

4. The vehicle lighting system according to claim 1, wherein: at least either of the upper lamps and the lower lamps each include a peripheral light emission unit placed on a periphery and an inside light emission unit placed on an inner side of the peripheral light emission unit; and the peripheral light emission unit and the inside light emission unit are allowed to illuminate independently of each other.

5. The vehicle lighting system according to claim 1, further comprising center lamps located in a region surrounded by the upper lamps and the lower lamps.

6. The vehicle lighting system according to claim 1, further comprising a character display device located between the annular lamps placed on the left and right sides.

7. A vehicle lighting system comprising:

a pair of upper lamps placed on left and right sides on a front face or a rear face of a vehicle body, each of the upper lamps having an upward-convex semicircular shape; and a pair of lower lamps placed on the left and right sides on the front face or the rear face of the vehicle body, each of the lower lamps having a downward-convex semicircular shape, wherein:

the lower lamps constitute annular lamps in conjunction with the respective upper lamps;

the upper lamps and lower lamps are allowed to illuminate independently of each other; and the upward-convex semicircular shape of the pair of upper lamps corresponds to an inverted shape of the downward-convex semicircular shape of the pair of lower lamps.

8. The vehicle lighting system according to claim 7, further comprising:

a controller adapted to control illumination of the upper lamps and the lower lamps; and a monitoring device adapted to detect any obstacle or person in a traveling direction of the vehicle, wherein when the monitoring device detects any obstacle or person, the controller causes only the upper lamps to illuminate.

9. The vehicle lighting system according to claim 7, further comprising:

a controller adapted to control illumination of the upper lamps and the lower lamps; and a charging status detection device adapted to detect charging status of a battery carried by the vehicle, the battery being able to be charged with external electric power, wherein when the charging status detection device detects that the battery is being charged, the controller causes only the lower lamps to illuminate.

10. The vehicle lighting system according to claim 7, wherein: at least either of the upper lamps and the lower lamps each include a peripheral light emission unit placed on a periphery and an inside light emission unit placed on an inner side of the peripheral light emission unit; and the peripheral light emission unit and the inside light emission unit are allowed to illuminate independently of each other.

11. The vehicle lighting system according to claim 7, further comprising center lamps located in a region surrounded by the upper lamps and the lower lamps.

12. The vehicle lighting system according to claim 7, further comprising a character display device located between the annular lamps placed on the left and right sides.

* * * * *